Sept. 7, 1926. 1,598,685
W. F. KIESEL, JR
BRAKE ARRANGEMENT FOR ELECTRIC SWITCHING LOCOMOTIVES
Filed May 5, 1926 3 Sheets-Sheet 1
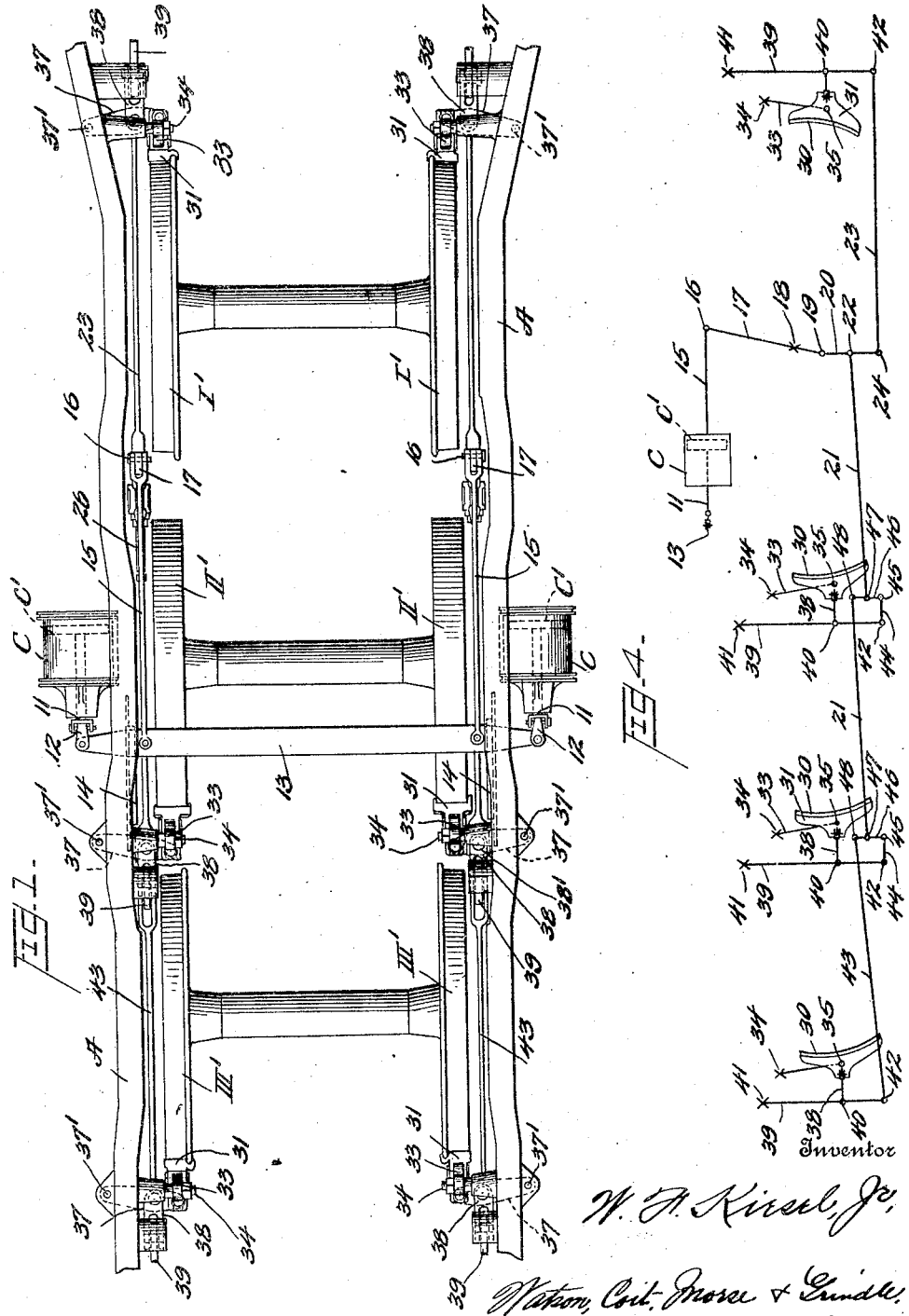

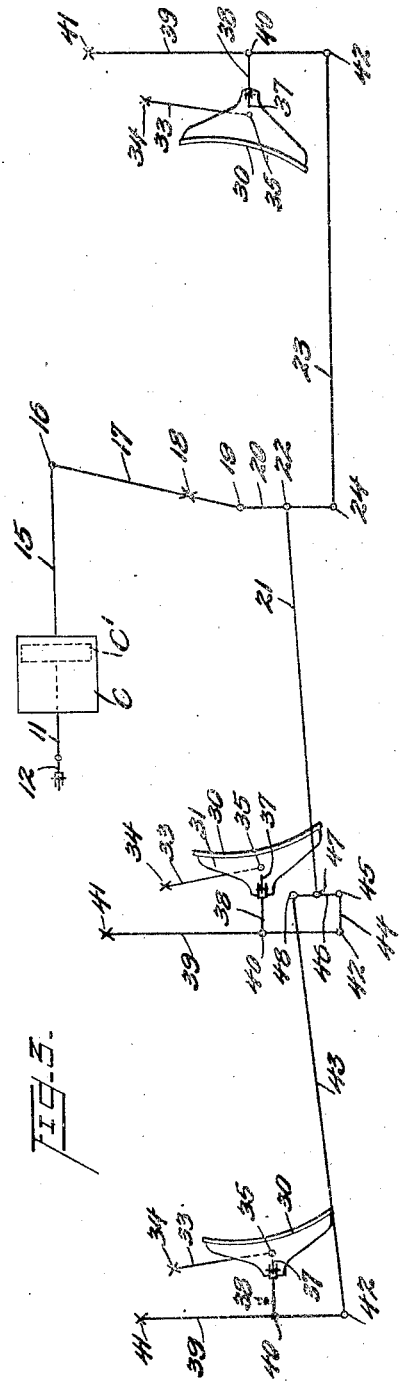
Sept. 7, 1926.
W. F. KIESEL, JR
1,598,685
BRAKE ARRANGEMENT FOR ELECTRIC SWITCHING LOCOMOTIVES
Filed May 5, 1926    3 Sheets-Sheet 2

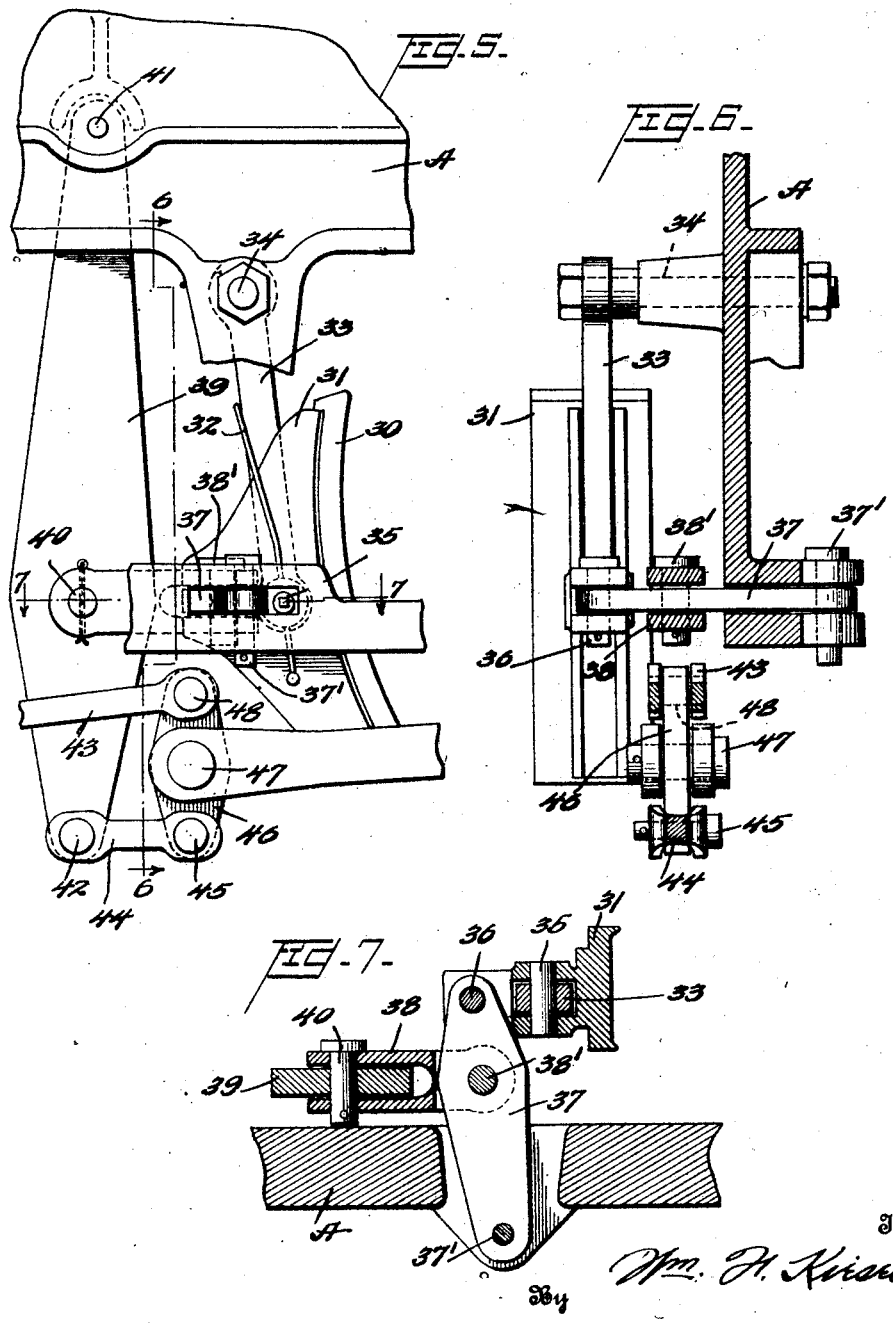

Patented Sept. 7, 1926.

1,598,685

UNITED STATES PATENT OFFICE.

WILLIAM F. KIESEL, JR., OF ALTOONA, PENNSYLVANIA.

BRAKE ARRANGEMENT FOR ELECTRIC SWITCHING LOCOMOTIVES.

Application filed May 5, 1926. Serial No. 106,958.

The present invention relates to brake gear for railway vehicles.

The current tendency in railway vehicle construction is to utilize the space between wheels on the trucks for various auxiliary apparatus appurtenant to the vehicle. Examples of this are found in electric generators for lighting passenger coaches and electric motors for driving multiple unit coaches and electric locomotives. It is readily apparent that when the space between wheels is thus utilized it is desirable to locate the brake gear for the wheels of the vehicle where it will least interfere with the positioning of such equipment and where the brake gear itself will be most accessible for inspection and repair.

The principal object of this invention is to provide a brake gear for the trucks of railway vehicles which shall be located, as far as possible, outside the wheels.

Another object is to provide a brake gear which shall be readily accessible for inspection and repair.

Another object is to provide a brake gear for multiple axle trucks which shall properly equalize the braking effect between the wheels of the several axles.

Another object is to provide a brake gear which will stand up under the constant pounding and vibration to which it will necessarily be subjected in service.

Other objects and features of novelty will be apparent from the description in connection with the accompanying drawings, in which:—

Figure 1 is a plan view of a three axle truck provided with brake gear according to the present invention;

Figure 2 is a side elevation thereof;

Figure 3 is a diagrammatic representation of the brake gear as applied to a three axle truck;

Figure 4 is a diagrammatic representation of the brake gear as applied to a four axle truck;

Figure 5 is an enlarged elevation of a portion of Fig. 2;

Figure 6 is a vertical section taken on line 6—6 of Fig. 5; and

Figure 7 is a horizontal section taken on line 7—7 of Fig. 5.

Referring to the drawings, it will be seen that the illustration is principally directed to a brake gear as applied to three axle, six-wheel trucks, such an embodiment being typical of all others, but it will be understood that the brake gear is adapted to be used on trucks having either more or less than six wheels. The truck has side frames A having pedestals (I, II, III) for supporting journal boxes for the ends of axles carrying wheels I', II', III' in pairs in a well-known manner. Each side frame A has rigidly attached to its outer side an air brake cylinder C housing a piston C' carrying a piston rod 11. A clevis 12 connects a piston rod 11 to each end of a transverse bar 13. The transverse bar 13 serves to transmit braking force from the brake cylinders which are outside the side frames to cylinder tension rods 15, which are located inside the side frames but outside the wheels on either side. Any other means may be utilized for this purpose and such means need not extend completely across the truck as does the bar shown. At its other end each cylinder tension rod is connected by a pin 16 to a cylinder lever 17 mounted for turning movement on a pin 18 secured to the side frame between a front wheel I' and the next following or intermediate rear wheel II'. A floating lever which will be here designated as a primary equalizing lever 20, serves to divide the braking force derived from the brake piston between the front wheel and the rear wheels on each side in such a manner that the front wheel shall receive the same braking pressure as each rear wheel. The floating lever 20 is pivoted at one end to the lower end of cylinder lever 17 by a pin 19, at an intermediate point to an intermediate brake tension rod 21 by a pin 22 and at the other end to a front brake tension rod 23 by a pin 24. The effective length of front brake tension rod 23 is adjustable by any suitable means. The means provided consists of a block 25 (Fig. 2) which carries the pin 24 and which may be secured in any desired position in a slot 23' in rod 23 by a set screw 26 having a lock nut 27.

Brake heads or clogs 31 carrying brake shoes 30 are swingingly supported adjacent and in the plane of each wheel by hangers 33, the hangers being pivoted by a pin 34 to projections on the side frame in such a position that the brake heads normally hang free of the wheels. A pin 35 serves to attach each brake head to its hanger and a U- shaped spring 32 fastened to the brake head and passed behind the hanger holds the brake head in upright position to prevent chatter between the brake head and wheel.

As stated above, the brake heads are located in the plane of the wheels while the brake actuating mechanism beyond the cylinder tension rod lies in a plane outside the wheels, being between the wheels and side frame and in order to connect across the gap each brake head has a transversely extending horizontal lever 37 connected thereto at one end by a pin 36. This horizontal lever 37, as best shown in Figs. 6 and 7, is secured at its other end to the side frame by a pin 37' and intermediate its ends by a pin 38' has connection to a clevis 38 which serves to connect the horizontal lever to a vertically disposed brake lever 39. A pin 40 connects the clevis 38 to brake lever 39. Each brake lever 39 is pivotally supported on the side frame by a pin 41 and has a pin 42 connecting its lower end to a brake tension rod. Each brake lever for the pair of wheels situated in front of the primary equalizing lever 20 is connected by a pin 42 directly to the front brake tension rod 23 and each brake lever for the last rear pair of wheels is connected by a pin 42 to a rear brake tension rod 43 but the brake levers for the other rear pairs of wheels situated behind the primary equalizing lever 20 are not directly connected to brake tension rods. The linkage for connecting the brake levers of these intermediate rear pairs of wheels into the rest of the brake gear must, for smooth braking, equalize the braking effect between the intermediate and other rear wheels. As here shown it consists of a tension link 44 pivoted at one end to brake lever 39 by pin 42 and pivoted at its other end by a pin 45 to a secondary equalizing lever 46. The equalizing lever 46 has working connection with an intermediate brake tension rod 21 through a pin 47, and with a rear brake tension rod 43 through a pin 48.

It will be apparent from the above description that two axle trucks do not require this secondary equalizing mechanism, the tension rod 21 in this case being directly connected to the brake lever of the single rear pair of wheels, and that four axle trucks require additional equalizing mechanism as clearly indicated in Fig. 4. The invention is not to be regarded as limited to the embodiment disclosed, but may have other forms and embodiments within the scope of the appended claims.

Having thus described the invention, what is claimed as new and desired to be secured by Letters Patent is:—

1. In a device of the character described, in combination a truck frame having a plurality of wheels in pairs, a transverse bar extending across said frame, brake actuating means connected to each end of said bar, brake heads for said wheels supported in the plane of the wheels, a horizontal lever for each brake head pivoted on said frame and connected to said brake head and connecting linkages between said horizontal levers and said transverse bar, there being two such linkages, each disposed in a plane outside of said wheels.

2. In a device of the character described, in combination, a truck frame having a plurality of wheels in pairs, a transverse bar extending across said frame, brake actuating means connected to each end of said bar, brake heads for said wheels supported in the plane of said wheels, a horizontal lever for each brake head pivoted on said frame and connected to said brake heads, and connecting linkages between said horizontal levers and said transverse bar, there being two such linkages each disposed in a plane outside of said wheels and including means for equalizing the effect produced by said brake actuating means between the front pair of wheels and all the rear pairs of wheels so that each pair of wheels will receive the same braking pressure.

3. In a device of the character described, in combination, a truck frame having a plurality of wheels in pairs, a transverse bar extending across said frame, brake actuating means connected to each end of said bar, brake heads for said wheels supported in the plane of said wheels, a horizontal lever for each head pivoted on said frame and connected to a brake head, and connecting linkages between said horizontal levers and said transverse bar, there being two such linkages each disposed in a plane outside of said wheels and including equalizing means between the front pair of wheels and all the rear pairs of wheels and further equalizing means between each pair of the rear pairs of wheels for evenly distributing the pressure produced by said actuating means between all of the wheels of the truck.

4. In a device of the character described, in combination, a six wheel truck, side frames on said truck for carrying the truck wheels, brake cylinders attached to each side frame, a transverse bar connected at each end to brake actuating means in said cylinders, cylinder levers disposed between the front pair of wheels and the rear pairs of wheels, cylinder tension rods connected to said transverse bar and to said cylinder levers for transmitting force therebetween, brake heads for each of said wheels, and means for transmitting force equally to said brake heads comprising primary equalizing levers also connected to said cylinder levers, a front brake tension rod for each side connecting a front wheel brake head to a primary equalizing lever, and an intermediate brake tension rod for each side connecting the brake heads of said rear pairs of wheels to said primary equalizing lever.

5. In a device of the character described, comprising in combination, a six wheel truck, side frames on said truck for carrying the truck wheels, a brake cylinder attached to the outside of each side frame, a transverse bar connected at each end to brake actuating means in said cylinders, a brake head for each of said wheels and connections on each side of the truck for actuating said brake heads from said transverse lever comprising, a cylinder lever disposed between the front wheel and the rear wheels, a cylinder tension rod connecting said transverse bar and said cylinder lever, a primary equalizing lever connected to said cylinder lever, a front brake tension rod connected to the brake head of the front wheel and to said primary equalizing lever, a rear brake tension rod connected to the brake head of the rear wheel, a tension link connected to the brake head of each intermediate wheel, a secondary equalizing lever connected at one point to said rear tension rod and at another point to said tension link, and an intermediate tension rod connected at a third point on said secondary equalizing lever and to said primary equalizing lever.

6. A brake gear for an electric locomotive, comprising in combination, brake heads for each wheel, a vertical hanger supported on the locomotive truck frame in the plane of said wheels for carrying said heads adjacent the wheels, horizontal levers each connected at one end to one of said brake heads and at its other end to the truck frame, a brake lever for each wheel supported on said frame outside of said wheels and connected to said horizontal lever at an intermediate point thereon and means on said truck frame for actuating said brake levers to move said brake heads toward said wheels.

7. In a device of the character described in combination, a truck frame having a plurality of wheels in pairs, brake heads for said wheels supported in the plane of the wheels, a horizontal lever for each brake head pivoted on said frame and connected to said brake head, and means to actuate the horizontal levers to apply the brakes including two linkages each disposed in a plane outside of said wheels.

8. In a device of the character described in combination, a truck frame having a plurality of wheels in pairs, brake heads for said wheels supported in the plane of the wheels, a horizontal lever for each brake head pivoted on said frame and connected to said brake head, and means to actuate the horizontal levers to apply the brakes including two linkages each disposed in a plane outside of said wheels, said linkages including equalizing means between the front pair of wheels and all of the rear pairs of wheels for evenly distributing the pressure produced by said actuating means between all the wheels of the truck.

9. In a device of the character described in combination, a truck frame having a plurality of wheels in pairs, brake heads for said wheels supported in the plane of the wheels, a horizontal lever for each brake head pivoted on said frame and connected to said brake head, and means to actuate the horizontal levers to apply the brakes including two linkages each disposed in a plane outside of said wheels, said linkages including equalizing means between the front pair of wheels and all the rear pairs of wheels and further equalizing means between each pair of the rear pairs of wheels for evenly distributing the pressure produced by said actuating means between all of the wheels of the truck.

10. In a device of the character described, comprising in combination, a truck having a plurality of pairs of wheels, side frames for carrying axles for said wheels, said frames being located in planes outside the planes of said wheels, a brake linkage for each side located in a plane intermediate the plane of said frame and the plane of said wheels, brake heads for each of the wheels located in the plane of said wheels, and horizontal levers for each side extending from the plane of said frame to the plane of said wheels, said horizontal levers being connected to said linkages intermediate their ends whereby movement imparted to said linkages will actuate the horizontal levers to press the brake heads against the wheels.

11. A truck comprising a pair of side frames, a plurality of pairs of wheels having axles carried at each end by said side frames, said wheels on each side lying in a plane inside the plane of the adjacent side frame, brake heads for each wheel, horizontal levers for each brake head extending between the plane of said wheels and the plane of said side frame, each horizontal lever being pivoted at one end to the adjacent frame and at the other end to a brake head, and linkages one for each side, lying in a plane between the wheels and side frame and connected to the horizontal levers at a point intermediate the lever ends.

In testimony whereof I hereunto affix my signature.

WILLIAM F. KIESEL, Jr.